(12) United States Patent
Wang et al.

(10) Patent No.: US 11,368,661 B2
(45) Date of Patent: Jun. 21, 2022

(54) IMAGE SYNTHESIS METHOD, APPARATUS AND DEVICE FOR FREE-VIEWPOINT

(71) Applicant: PEKING UNIVERSITY SHENZHEN GRADUATE SCHOOL, Shenzhen (CN)

(72) Inventors: Ronggang Wang, Shenzhen (CN); Sheng Wang, Shenzhen (CN); Zhenyu Wang, Shenzhen (CN); Wen Gao, Shenzhen (CN)

(73) Assignee: PEKING UNIVERSITY SHENZHEN GRADUATE SCHOOL, Shenzhen (CN)

( * ) Notice: Subject to any disclaimer, the term of this patent is extended or adjusted under 35 U.S.C. 154(b) by 0 days.

(21) Appl. No.: 16/610,296

(22) PCT Filed: Feb. 14, 2019

(86) PCT No.: PCT/CN2019/075056
§ 371 (c)(1),
(2) Date: Nov. 1, 2019

(87) PCT Pub. No.: WO2020/164044
PCT Pub. Date: Aug. 20, 2020

(65) Prior Publication Data
US 2021/0368153 A1 Nov. 25, 2021

(51) Int. Cl.
*H04N 13/128* (2018.01)
*G06T 7/215* (2017.01)
(Continued)

(52) U.S. Cl.
CPC .......... *H04N 13/128* (2018.05); *G06T 7/215* (2017.01); *H04N 13/156* (2018.05); *H04N 13/344* (2018.05); *H04N 2013/0077* (2013.01)

(58) Field of Classification Search
CPC .. H04N 13/128; H04N 13/156; H04N 13/344; H04N 2013/0077; G06T 7/215
(Continued)

(56) References Cited

U.S. PATENT DOCUMENTS

| 9,736,449 B1* | 8/2017 | Fan ..................... H04N 13/128 |
| 2013/0321590 A1* | 12/2013 | Kirk ..................... H04N 13/246 |
| | | 348/48 |

(Continued)

FOREIGN PATENT DOCUMENTS

| CN | 103581648 A | 2/2014 |
| CN | 104780355 A | 7/2015 |

(Continued)

*Primary Examiner* — Tung T Vo
(74) *Attorney, Agent, or Firm* — Miles & Stockbridge P.C.

(57) ABSTRACT

The embodiment of the present specification discloses an image synthesis method, apparatus and device for free-viewpoint. The method includes: correcting a first depth map based on a first color map and the first depth map inputted, wherein the first color map includes a left image and a right image, and the first depth map includes a left image and a right image; forward-projecting the second depth map to a virtual viewpoint position based on the pose of a virtual viewpoint to obtain a third depth map, where the third depth map is a projection map located at the virtual viewpoint position; back-projecting the left and right color maps closest to the virtual viewpoint position in the first color map to the virtual viewpoint position based on the third depth map to obtain a second color map, where the second color map is a projection view of the first color map at the virtual viewpoint position; correcting the second color map by using an optical flow algorithm to obtain a third color map, where the optical flow algorithm implements aligning the left and right images of the second color map; performing (Continued)

weighting calculation and blendering on the third color map to obtain a composite image.

20 Claims, 4 Drawing Sheets

(51) Int. Cl.
*H04N 13/156* (2018.01)
*H04N 13/344* (2018.01)
*H04N 13/00* (2018.01)

(58) Field of Classification Search
USPC .......................................................... 348/43
See application file for complete search history.

(56) References Cited

U.S. PATENT DOCUMENTS

| | | | |
|---|---|---|---|
| 2014/0118482 A1 | 5/2014 | Noh et al. | |
| 2015/0341616 A1* | 11/2015 | Siegel | H04N 13/261 |
| | | | 348/54 |
| 2019/0320186 A1* | 10/2019 | Liu | H04N 19/179 |
| 2020/0082541 A1* | 3/2020 | Jouppi | G06T 7/194 |

FOREIGN PATENT DOCUMENTS

| | | |
|---|---|---|
| CN | 108259917 A | 7/2018 |
| CN | 109194888 A | 1/2019 |

\* cited by examiner

IMAGE SYNTHESIS METHOD, APPARATUS AND DEVICE FOR FREE-VIEWPOINT

CROSS-REFERENCE TO RELATED APPLICATION

The present application is a national stage filing under 35 U.S.C. § 371 of PCT/CN2019/075056, filed on Feb. 14, 2019. The application is incorporated herein by reference in its entirety.

FIELD

This specification relates to the field of digital video processing technology, and more particularly, relates to an image synthesis method, apparatus and device for free-viewpoint.

BACKGROUND

With the development of information technology, people are increasingly demanding video viewing, the traditional way of providing a single viewing angle is no longer able to meet the viewer's multi-view viewing needs. Accordingly, free-viewpoint synthetic technology came into being to adapt to the development of next-generation TV video playback technology.

In the prior art, the depth map constructed for the viewing scene has defects such as the depth of the edge of the depth map and the edge of the color map, and the error of the depth map. Accordingly, existing method for synthesizing free-viewpoint based on DIBR (depth Image-based Rendering) cannot synthesize images well, and the synthesized images may have problems such as ghosts, holes, and distortions.

Based on the prior art, a new free-viewpoint image synthesis method is needed, which can better synthesize images, eliminate or reduce ghosts, holes, distortions, etc. in synthetic images.

SUMMARY

The embodiment of the present specification provides a method, apparatus and device for synthesizing a free-viewpoint image, which are used for solving the following technical problems: synthesizing images well, eliminating or reducing ghosts, holes, distortions, etc. in the composite image.

In order to solve the technical problems above, the embodiment of the present specification is implemented in this way, the embodiment of the present specification provides an image synthesis method for a free-viewpoint, comprising: correcting a first depth map based on a first color map and the first depth map inputted, wherein the first color map includes a left image and a right image, and the first depth map includes a left image and a right image; forward-projecting the second depth map to a virtual viewpoint position based on the pose of a virtual viewpoint to obtain a third depth map, where the third depth map is a projection map located at the virtual viewpoint position; back-projecting the left and right color maps closest to the virtual viewpoint position in the first color map to the virtual viewpoint position based on the third depth map to obtain a second color map, where the second color map is a projection view of the first color map at the virtual viewpoint position; correcting the second color map by using an optical flow algorithm to obtain a third color map, where the optical flow algorithm implements aligning the left and right images of the second color map; performing weighting calculation and blending on the third color map to obtain a composite image.

The embodiment of the present specification provides an image synthesis apparatus for a free-viewpoint, comprising: receiving module, to receive a first color map and a first depth map; processing module, to process the first color map and the first depth map to synthesize an image; output module, to output the composite image.

Preferably, the processing the first color map and the first depth map to synthesize an image comprises: correcting a first depth map based on a first color map and the first depth map inputted, wherein the first color map includes a left image and a right image, and the first depth map includes a left image and a right image; forward-projecting the second depth map to a virtual viewpoint position based on the pose of a virtual viewpoint to obtain a third depth map, where the third depth map is a projection map located at the virtual viewpoint position; back-projecting the left and right color maps closest to the virtual viewpoint position in the first color map to the virtual viewpoint position based on the third depth map to obtain a second color map, where the second color map is a projection view of the first color map at the virtual viewpoint position; correcting the second color map by using an optical flow algorithm to obtain a third color map, where the optical flow algorithm implements aligning the left and right images of the second color map; performing weighting calculation and blending on the third color map to obtain a composite image.

The embodiment of the present specification further provides an electronic device including: at least one processor; and a memory communicatively coupled to the at least one processor; where the memory stores instructions executable by the at least one processor, the instructions are executed by the at least one processor to enable the at least one processor to: correcting a first depth map based on a first color map and the first depth map inputted, wherein the first color map includes a left image and a right image, and the first depth map includes a left image and a right image; forward-projecting the second depth map to a virtual viewpoint position based on the pose of a virtual viewpoint to obtain a third depth map, where the third depth map is a projection map located at the virtual viewpoint position; back-projecting the left and right color maps closest to the virtual viewpoint position in the first color map to the virtual viewpoint position based on the third depth map to obtain a second color map, where the second color map is a projection view of the first color map at the virtual viewpoint position; correcting the second color map by using an optical flow algorithm to obtain a third color map, where the optical flow algorithm implements aligning the left and right images of the second color map; performing weighting calculation and blending on the third color map to obtain a composite image.

The embodiment of the present specification further provides a computer readable storage medium for storing a program, and when the program is executed, realizing image synthesis of a free-viewpoint.

The above at least one technical scheme adopted by the embodiments of the present specification can achieve the following beneficial effects: in this embodiment, the image is synthesized by the method provided in the embodiments of the present specification, and a better composite image can be realized, and a higher quality composite image is obtained, and eliminating or reducing ghosts, holes, distortions, etc. in composite images.

BRIEF DESCRIPTION OF THE DRAWINGS

In order to more clearly illustrate the embodiments of the present specification or the technical schemes in the prior art, the drawings used in the embodiments or the prior art description will be briefly introduced below, obviously, the drawings in the following description are only some of the embodiments described in this specification, for those skilled in the art, other drawings can be obtained according to these drawings without paying creative labor.

DETAILED DESCRIPTION OF EMBODIMENTS

In order to enable a person skilled in the art to better understand the technical schemes in the present specification, the technical schemes in the embodiments of the present specification will be clearly and completely described below in conjunction with the drawings in the embodiments of the present specification, obviously, the described embodiments are only a part of the embodiments of the present application, and not all of the embodiments. Based on the embodiments of the present specification, all other embodiments obtained by those skilled in the art without creative efforts shall fall within the scope of protection of the present application.

Figure 1:
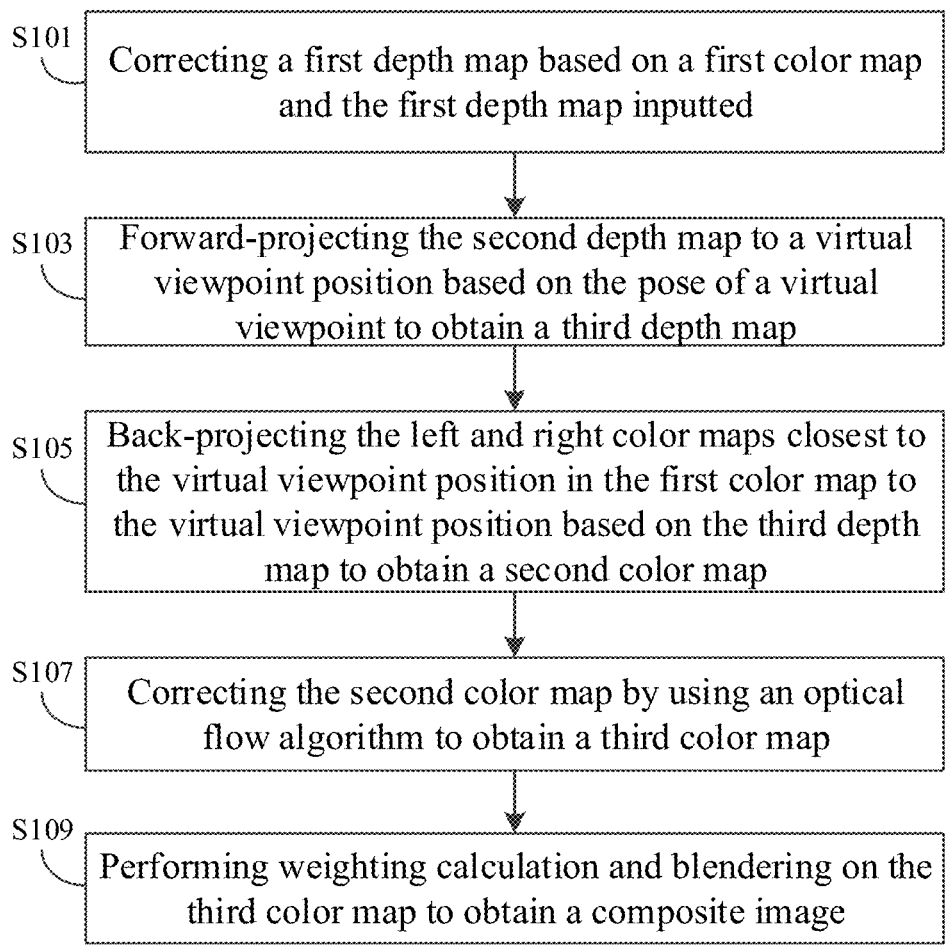
FIG. 1 is a flowchart of a method for synthesizing free-viewpoint image according to an embodiment of the present disclosure.

In the free-viewpoint synthesis technology, the quality of the depth image directly affects the effect of the composite image. For low-quality depth maps such as the edges of the depth map and the edges of the color map do not correspond, and the depth distribution of the depth map is uneven, when using the prior art in DIBR-based free-viewpoint image synthesis, it is not possible to synthesize images well, and problems such as ghosts, holes, distortions, etc. may occur. Therefore, the present invention provides a new image synthesis method, as shown in FIG. 1. FIG. 1 is a flowchart of a method for synthesizing an image of a free-viewpoint according to an embodiment of the present disclosure, specifically, including:

S101: correcting a first depth map based on a first color map and the first depth map inputted.

In one embodiment of the present specification, simultaneously input the first color map and the first depth map. It should be specially noted that the first color map includes a left image and a right image, and the first depth map includes a left image and a right image, where the left and right images respectively represent images taken by the left and right imaging devices. It should be particularly noted that the imaging device may be, but not limited to a camera.

In one embodiment of the present specification, the first color map is an image taken by an imaging device of different poses, the first depth map is an image taken by an imaging device of different poses and/or an image obtained by using a depth estimation algorithm.

In one embodiment of the present specification, correcting the first depth map to obtain a second depth map, specifically including: extracting edge information of the first color map and the first depth map, and expanding the edge of the first depth map such that the edge of the first depth map is aligned with the edge of the first color map; smoothing the first depth map aligned with the edge of the first color map to obtain a second depth map.

In the specific implementation process, the edge information of the first color map and the first depth map may be extracted by using a Roberts Cross operator, a Prewitt operator, a Sobel operator, a Kirsch operator, a Laplacian operator, a Canny operator, and the like, In one embodiment of the present specification, when extracting the edges of the first color map and the first depth map, the Canny operator is preferred. In order to avoid the problem of excessive edge texture when using the Canny operator to detect the edges of color maps and depth maps, the thresholds in the Canny operator function are set to 10 and 30 respectively during the implementation.

In one embodiment of the present specification, aligning the edges of the first depth map and the first color map includes: extracting the edge of the first color map and the edge of the first depth map, and using the edge of the first color map as a reference, detecting a foreground edge and a background edge of the edge of the first depth map; when detecting the background direction, detecting whether the edge of the first color map exists within the first threshold range along a background direction of the foreground edge of the first depth edge; If the edge of the first color map does not exist within the first threshold range, no extended alignment is needed; If the first threshold range exists within the edge of the first color map, a second detection is performed; when detecting the foreground direction, detecting whether the edge of the first color map exists in a second threshold range along the foreground direction of the foreground edge of the first depth edge; If the first threshold range exists within the edge of the first color map, if the edge of the first color map does not exist in the second threshold range, no extended alignment is needed, replacing the background depth value in the path along the background direction with the nearest foreground depth value until the first color image edge for the foreground edge of the first depth map, to align the edge of the first depth map with the edge of the first color map.

It should be particularly noted that the first test is to initially determine whether the edge of the first depth map needs to be extended, because the background direction of the foreground edge of the first depth map has the edge of the first color map, it indicates that the edge of the first depth map may have an erroneous edge region, and may also belong to the correct edge, and therefore, when the edge of the first color map is found Need further testing when it belongs to the edge of the foreground. Detecting the foreground direction is to avoid setting the correct background edge as the foreground edge, ensuring the accuracy of edge extension alignment. In a specific implementation process, extending the foreground edge of the depth map into the background direction, replacing the background depth value with the nearest foreground depth value until the edge of the color map aligns the edge of the depth map with the edge of the color map.

In one embodiment of the present specification, the range of the first threshold and the second threshold mentioned in the method of aligning the edges of the first depth map and the first color map may be manually adjusted according to the image size. In one embodiment of the present specification, the first threshold is preferably 20 pixels, and the second threshold is preferably 20 pixels.

Figure 2:
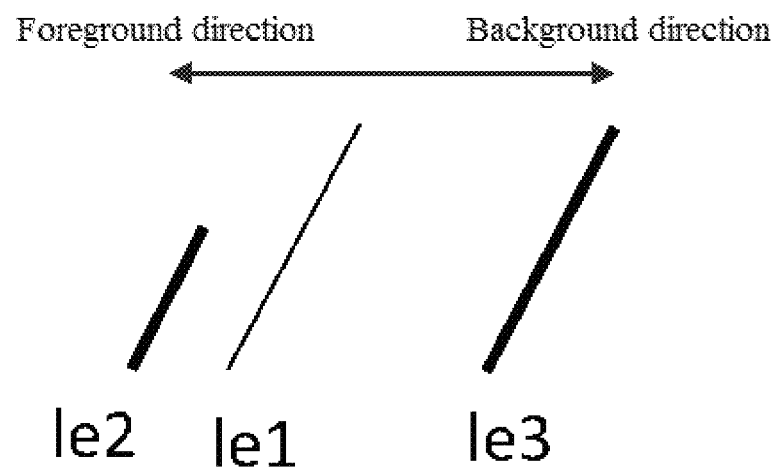
FIG. 2 is a schematic diagram of edge alignment of a depth map and a color map according to an embodiment of the present specification.

In order to understand the edge alignment of the depth map and the color map, as shown in detail as shown in FIG. 2. FIG. 2 is a schematic diagram of edge alignment of a depth map and a color map according to an embodiment of the present specification. In the diagram, $1e1$ is the foreground edge, looking for the edges $1e2$ and $1e3$ of the color map in the foreground direction and the background direction by using the edge alignment method of the first depth map and the first color map described above. As shown in the schematic, the upper half of $1e1$ has a background in the background direction, but there is no foreground in the foreground direction, so it needs to be extended; the lower half of $1e1$ has a background in the background direction, but there is a foreground in the foreground direction, so no expansion is required.

In one embodiment of the present specification, smoothing the first depth map aligned with the edge of the first color map to obtain a second depth map, includes: the first depth map aligned with the edge of the first color map is detected line by line according to a third threshold, determining whether there is a large depth change case of the first depth map where the edge of the first depth map aligned with the edge of the first color map; if the depth change exceeds the third threshold, the edge having a large depth change in the first depth map aligned with the edge of the first color map is linearly changed utilizing the front 3 pixels and the following 3 pixels to replace the original pixel value to obtain a second depth map.

It should be particularly noted that 10% of the maximum depth variation of the first depth map in which the edges of the first color map are aligned may be used as the third threshold. Furthermore, since the depth distribution of the depth map is a change of the histogram, the depth value remains unchanged within a certain range. When the image is smoothed, if the depth value of the depth map changes too much, such as from 1 to 10 suddenly, the position X where the mutation occurs can be considered. Taking 7 pixels between x−3 and x+3, uniformly sampling according to the depth value of the x−3 position and the depth value of the x+3 position, of course, can be selected between x−5 and x+5 11 pixels, sampled in a similar way for smoothing.

S103: forward-projecting the second depth map to the virtual viewpoint position based on the pose of the virtual viewpoint to obtain a third depth map.

It should be particularly noted that the virtual viewpoint position is a position that the viewer wants to view, so the virtual viewpoint position can be artificially fixed. The virtual viewpoint position is preferably located between the plurality of imaging devices.

The third depth map obtained by this method tends to have cracks, so further filtering is required, in one embodiment of the present specification, filtering by the median filter.

S105: back-projecting the left and right color maps closest to the virtual viewpoint position in the first color map to the virtual viewpoint position based on the third depth map to obtain a second color map.

The second color map obtained in this step may have image information vacancies. Therefore, it is necessary to supplement the left and right image information of the second color map; if a position on either side of the left and right diagrams of the second color map is empty, and the corresponding position of the opposite side is colored, the corresponding position of the opposite side of the second color map is the color is assigned to the empty side; if the position on either side of the left and right diagrams of the second color map is empty and the corresponding position on the opposite side is also empty, no assignment is made on either side of the second color map.

S107: correcting the second color map by using an optical flow algorithm to obtain a third color map.

Based on the foregoing steps S103 and S105, the second depth map is forward projected to obtain a third depth map, and thus the second color map is obtained by back projection, and there may be an error due to the left and right images of the second depth map. There may be a misalignment between the obtained second color maps, and the misalignment cannot be ignored.

Accordingly, in the present invention, correcting the second color map by using an optical flow algorithm to obtain a third color map, including: calculating an offset of the left image of the second color image relative to the right image and an offset of the right image of the second color image relative to the left image based on the optical flow algorithm; calculating a calibration offset of the left image relative to the right image of the second color image and a calibration offset of the right image of the second color image relative to the left image based on the virtual viewpoint position; moving the left and/or right view of the second color map based on the calibration offset of the left image relative to the right image of the second color map and the right image of the second color map relative to the calibration offset of the left image to obtain the third color map.

In one embodiment of the present specification, the optical flow offset f1 of the left image of the second color image and the optical flow offset f2 of the right image of the second color image are calculated by the Deep Flow optical flow algorithm; then, according to the ratio $I1/(I1\ I2)$ of the virtual viewpoint position relative to the left image of the second color map and the ratio $I2/(I1\ I2)$ of the virtual viewpoint position to the position of the right image to obtain the offset of the left picture as $LR=f1*(I1/(I1+I2))$ and the offset of the right picture is $RL=f2*(I2/(I1+I2))$, moving the left and/or right image of the second color map according to the offsets on the left and right. Specifically, moving the pixel (xi, yi) in the left image to (xi+LRx, yi+LRy), and moving the pixel (xi, yi) in the image on the right to (xi+RLx, yi+RLy) to obtain a third color map.

S109: performing weighting calculation and blendering on the third color map to obtain a composite image.

The third depth map obtained by the method of the foregoing step S107 is in a calibration position, and further weighting and blendering is performed to obtain a composite image, specifically: determining the weights of the left image and the right image of the third color map based on the positions of the left and right images of the third color map and the virtual viewpoint position, Wherein the weights of the left image and the right image of the third color map are based on the weights of the virtual viewpoint locations; performing the weighting calculation and blendering according to the weight of the left image of the third color map and the weight of the right image to obtain a composite image.

It should be particularly noted that the weighting calculation method preferably uses the alpha blending algorithm.

Figure 3:
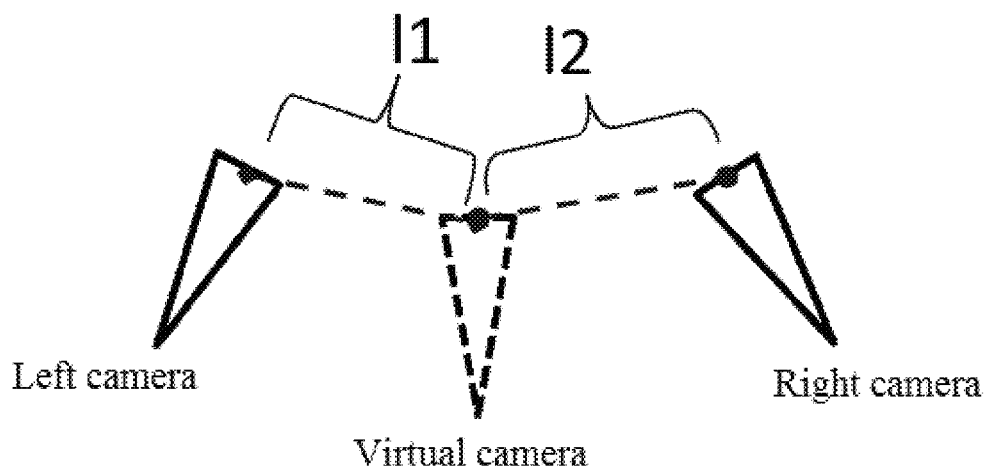
FIG. 3 is a position of a virtual viewpoint position relative to a left and right map according to an embodiment of the present disclosure.

In order to facilitate the understanding of the weighting calculation of the embodiments of the present specification, FIG. 3 is a position of a virtual viewpoint position relative to a left and right map according to an embodiment of the present disclosure, specifically, using the positional relationship between the virtual view position and the left image of the third color map and the right image of the third color map, determining the weight of the left image of the third color image and the weight of the right image of the third color image, and obtaining a composite image by weighting calculation and blending image.

Because there may be local vacancies in the composite image, the image inpainting algorithm needs to be further used to repair the composite image to fill the local vacancies in the composite image. In one embodiment of the present specification, Image inpainting algorithm prefers FMM algorithm (Fast Marching Method), the idea of the algorithm is to first process the pixels on the edge of the area to be repaired, and then push the layers inward until all the pixels are repaired.

The edge of the repaired composite image may have a large change, and therefore, the composite image needs to be further smoothed. Specifically, extracting the edge region of the third depth map in the repaired composite image, and performing median filtering on the edge region of the third depth map; extracting the edge region of the repaired composite image, and performing Gaussian blur on the edge region of the composite image.

Figure 4:
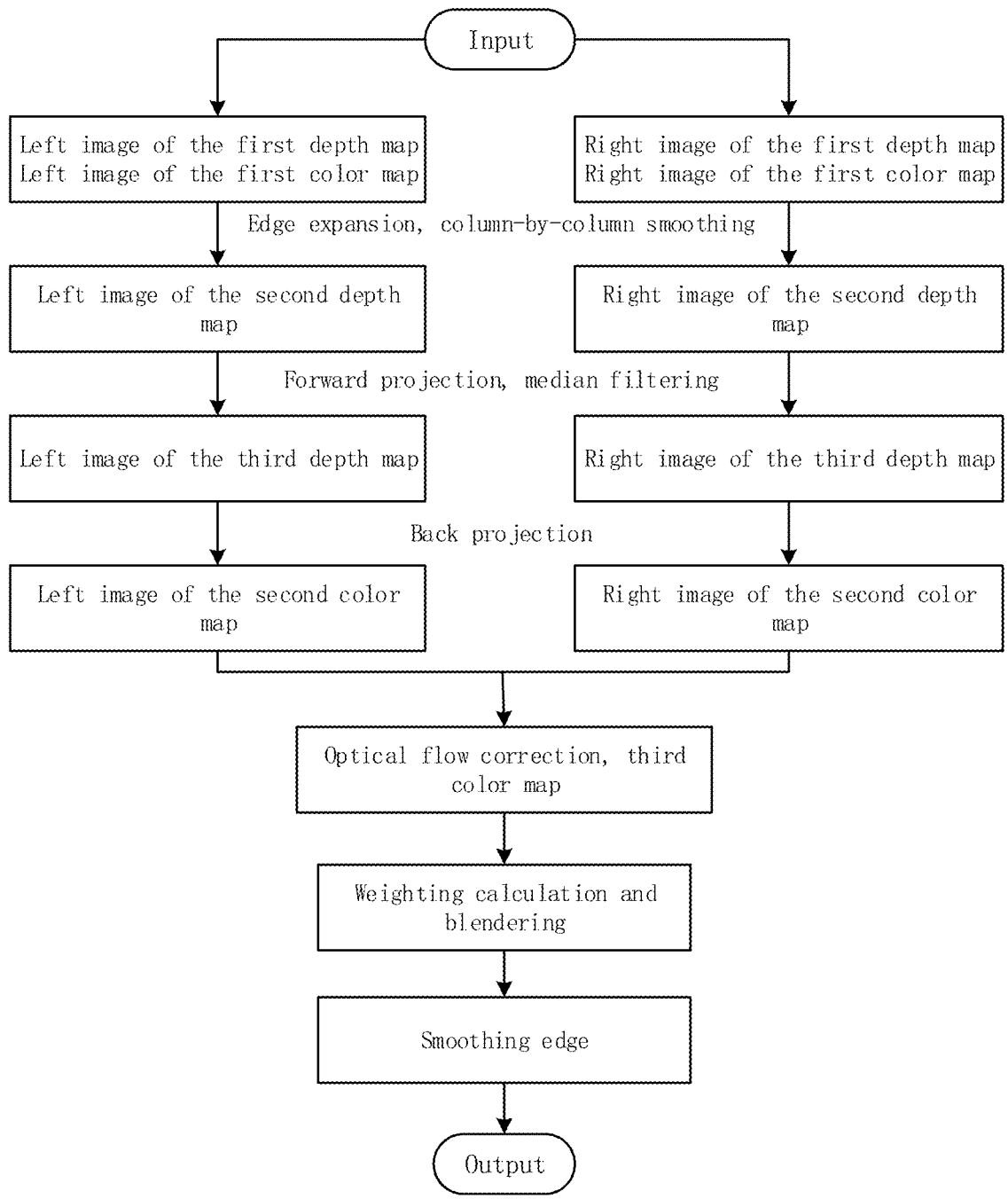
FIG. 4 is a system framework diagram of an image synthesis method of a free-viewpoint according to an embodiment of the present disclosure.

Based on the above method, the image synthesizing method provided by the embodiment of the present specification can be represented by FIG. 4. FIG. 4 is a system framework diagram of an image synthesis method of a free-viewpoint according to an embodiment of the present disclosure.

It should be particularly noted that by adopting the method provided in the embodiments of the present specification, it is possible to handle the case of multiple imaging devices placed horizontally, and the case where multiple imaging devices are arranged in a ring shape.

The image is synthesized by the method provided in the embodiments of the present specification, and a better composite image can be realized, and a higher quality composite image is obtained, and eliminating or reducing ghosts, holes, distortions, etc. in composite images.

Figure 5:
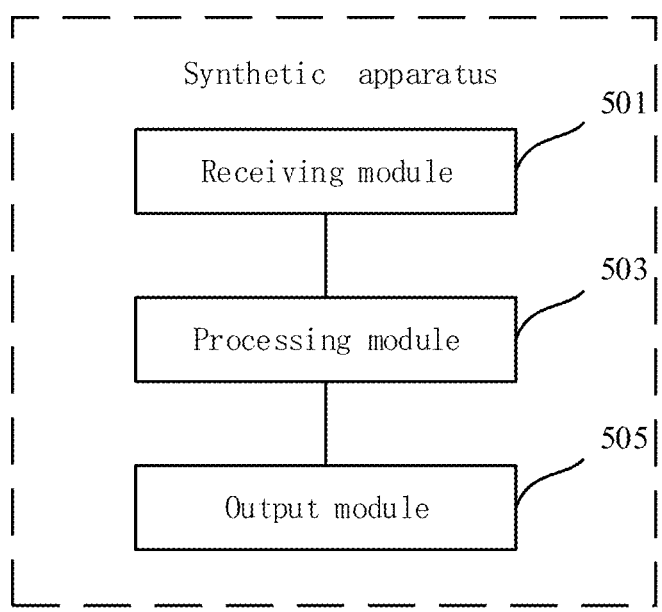
FIG. 5 is a schematic diagram of an apparatus for synthesizing free-viewpoint image according to an embodiment of the present disclosure.

The above content provides a method for synthesizing a free-viewpoint image in detail, and correspondingly, the present application also provides an image synthesizing device with a free-viewpoint. FIG. 5 is a schematic diagram of a free-viewpoint image synthesizing apparatus according to an embodiment of the present disclosure, which specifically includes: receiving module 501, to receive a first color map and a first depth map; processing module 503, to process the first color map and the first depth map to synthesize an image; output module 505, to output the composite image.

Based on the same idea, the embodiment of the present specification further provides an electronic device including: at least one processor; and a memory communicatively coupled to the at least one processor; where the memory stores instructions executable by the at least one processor, the instructions are executed by the at least one processor to enable the at least one processor to: correcting a first depth map based on a first color map and the first depth map inputted, wherein the first color map includes a left image and a right image, and the first depth map includes a left image and a right image; forward-projecting the second depth map to a virtual viewpoint position based on the pose of a virtual viewpoint to obtain a third depth map, where the third depth map is a projection map located at the virtual viewpoint position; back-projecting the left and right color maps closest to the virtual viewpoint position in the first color map to the virtual viewpoint position based on the third depth map to obtain a second color map, where the second color map is a projection view of the first color map at the virtual viewpoint position; correcting the second color map by using an optical flow algorithm to obtain a third color map, where the optical flow algorithm implements aligning the left and right images of the second color map; performing weighting calculation and blendering on the third color map to obtain a composite image.

Based on the same idea, the embodiment of the present specification further provides a computer readable storage medium for storing a program, and when the program is executed, realizing image synthesis of a free-viewpoint.

The specific embodiments of the present specification have been described above. Other embodiments are within the scope of the appended claims. In some cases, the actions or steps recited in the claims can be performed in a different order than in the embodiments and can still achieve desired results. In addition, the processes depicted in the figures are not necessarily required to achieve the desired results only in the certain order as shown. In some embodiments, multitasking and parallel processing are also possible or may be advantageous.

The various embodiments in the present specification are described in a progressive manner, and the same similar parts between the various embodiments may be referred to each other, and each embodiment focuses on the differences from the other embodiments. Especially for the embodiment of the device, the electronic device, and the non-volatile computer storage medium, since they are like the method embodiment basically, the descriptions thereof are relatively simple, and the relevant parts can be referred to the description of the method embodiment.

The device, the electronic device, the non-volatile computer storage medium and the method provided by the embodiments of the present specification are corresponding, and therefore, the device, the electronic device, and the non-volatile computer storage medium also have similar beneficial technical effects as the corresponding methods. Since the beneficial technical effects of the method have been described in detail above, the beneficial technical effects of the corresponding device, the electronic device, and the non-volatile computer storage medium will not be described herein.

In the 1990s, it was clear that improvements to a technology were improvements to hardware (for example, improvements to circuit structures such as diodes, transistors, switches, etc.) or improvements to software (improvements to process flow). However, with the development of technology, many of the improvements to process flow can now be considered as direct improvements to the hardware circuit structure. Designers always get corresponding hardware circuit structure by programming the improved process flow into the hardware circuit. Therefore, it cannot say that an improvement of process flow cannot be implemented with hardware entity modules. For example, a Programmable Logic Device (PLD) (such as a Field Programmable Gate Array (FPGA)) is an integrated circuit whose logic function is determined by programming the device by a user. Designers programmatically "integrate" a digital system onto a single PLD without having to ask the chip manufacturer to design and fabricate a dedicated integrated circuit chip. Moreover, today, instead of manually making integrated circuit chips, the programming is mostly implemented by using "logic compiler" software, which is similar to the software compiler used in programming development, and the original code to be compiled also needs to be written in a specific programming language called Hardware Description Language (HDL), and there is not just one kind of HDL, but many kinds of HDL, such as BEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, RHDL (Ruby Hardware Description Language), etc., wherein VHDL (Very-High-Speed Integrated Circuit Hardware Description Language) and Verilog are the most commonly used. It should also be clear to those skilled in the art that, the hardware circuit that implements the logic process flow can be easily got only by using above hardware description languages to logically program the process flow and to program the process flow into the integrated circuit.

A controller can be implemented in any suitable manner, for example, the controller can take a form of, for example, a microprocessor or a processor, a computer readable medium storing the computer readable program code (for example, software or firmware) executable by the (micro) processor, logic gates, switches, Application Specific Integrated Circuit (ASIC), programmable logic controllers and embedded microcontrollers, and examples of the controllers include but not limited to the following microcontrollers: ARC 625D, Atmel AT91SAM, Microchip PIC18F26K20 and Silicone Labs C8051F320, and a memory controller can also be implemented as a part of the control logic of a memory. It is known to those skilled in the art that, in addition to implement the controller by the way of purely computer readable program code, it is entirely possible to implement the same function in a form of logic gates, switches, Application Specific Integrated Circuit (ASIC), programmable logic controllers, embedded microcontrollers, etc., by logically programming the method steps. Therefore, such a controller can be considered as a hardware component, and devices included therein for implementing various functions can also be regarded as structures within the hardware component. Or even, devices used to implement various functions can be regarded as software modules of implementation method and structures within the hardware component.

The system, device, module or unit illustrated in the above embodiments may be implemented by a computer chip or an entity, or by a product with a certain function. A typical implementation device is a computer. Specifically, the computer can be, for example, a personal computer, a laptop, a cellular phone, a camera phone, a smart phone, a personal digital assistant, a media player, a navigation device, an email device, a gaming console, a tablet, a wearable device, or a combination of any devices from above.

For the convenience of description, the above system is described as different units according to the functions thereof respectively. Of course, the functions of the respective modules or units can be performed in the same one or more items of software or hardware in an implementation of the invention.

Those skilled in the art should understand that the embodiments of this application can be provided as method, system or products of computer programs. Therefore, the embodiments of this disclosure may be realized by complete hardware embodiments, complete software embodiments, or software-hardware combined embodiments. On one or multiple storage media (including but not limit to disk memory, CD-ROM, optical memory, etc.

The present description is described in terms of a flowchart, and/or a block diagram of a method, apparatus (system), and computer program product according to embodiments of the present specification. It will be understood that each flow and/or block of the flowcharts and/or block diagrams, and combinations of flows and/or blocks in the flowcharts and/or block diagrams can be implemented by computer program instructions. These computer program instructions can be provided to a processor of a general purpose computer, special purpose computer, embedded processor, or other programmable data processing device to produce a machine for the execution of instructions for execution by a processor of a computer or other programmable data processing device, means for implementing the functions specified in one or more processes and/or block diagrams of one or more blocks of the flowchart.

The computer program instructions can also be stored in a computer readable memory that can direct a computer or other programmable data processing device to operate in a particular manner, such that the instructions stored in the computer readable memory produce an article of manufacture comprising the instruction device, the device implements the functions specified in one or more blocks of a flow or a flow and/or a block diagram of the flowchart.

These computer program instructions can also be loaded onto a computer or other programmable data processing device such that a series of operational steps are performed on a computer or other programmable device to produce computer-implemented processing for execution on a computer or other programmable device, the instructions provide steps for implementing the functions specified in one or more of the flow or in one or more blocks of the flow chart and/or block diagram.

In a typical configuration, the computing device includes one or more processors (CPUs), input/output interfaces, network interfaces, and memory.

The memory may include non-persistent memory, random access memory (RAM), and/or non-volatile memory in a computer readable medium, such as read only memory (ROM) or flash memory. Memory is an example of a computer readable medium.

The computer readable medium includes both permanent and non-permanent, removable and non-removable, and the medium can be implemented by any method or technology. Information can be computer readable instructions, data structures, modules of programs, or other data. Examples of computer storage media include, but are not limited to, phase change memory (PRAM), static random access memory (SRAM), dynamic random access memory (DRAM), other types of random access memory (RAM), read only memory (ROM), electrically erasable programmable read only memory (EEPROM), flash memory or other memory technology, compact disk read only memory (CD-ROM), digital versatile disk (DVD) or other optical storage, Magnetic tape cartridges, magnetic tape storage or other magnetic storage devices or any other non-transportable media that can be used for storage or information accessed by computing devices. As defined herein, computer readable media does not include temporary storage computer readable media, such as modulated data signals and carrier waves.

It is also to be understood that the terms "comprising" or "containing" or any other variations are intended to encompass a non-exclusive inclusion, lead to a process, method, commodity, or device that includes a series of elements includes not only those elements but also other elements not explicitly listed, or elements that are inherent to the process, method, article, or device. In the absence of more restrictions, elements defined by the phrase "comprising a ..." do not exclude the presence of additional identical elements in the process, method, article, or device that includes the element.

This description can be described in the general context of computer-executable instructions executed by a computer, such as a program module. Generally, program modules include routines, programs, objects, components, data structures, and the like that perform specific task or implement specific abstract data types. It is also possible to practice the description in a distributed computing environment in which tasks are performed by remote processing devices that are connected through a communication network. In a distributed computing environment, program modules can locate in both local and remote computer storage media including storage devices.

The various embodiments in the present specification are described in a progressive manner, and the same or similar parts between the various embodiments may be referred to each other, and each embodiment focuses on the differences from other embodiments. For the system embodiment, since it is basically similar to the method embodiment, the description is relatively simple, and the relevant parts can be referred to the description of the method embodiment.

The aspects described above is only for the embodiments of the present specification, and it is not intended to limit this application. Various changes and variations can be made to the application by those skilled in the art. Any modifications, equivalents, improvements, etc. made within the spirit and principles of the present application are intended to be included within the scope of the claims of the present application.

We claim:

1. An image synthesis method for free-viewpoint, including:
    correcting a first depth map based on a first color map and the first depth map inputted, wherein the first color map includes a left image and a right image, and the first depth map includes a left image and a right image;
    forward-projecting a second depth map to a virtual viewpoint position based on the pose of a virtual viewpoint to obtain a third depth map, where the third depth map is a projection map located at the virtual viewpoint position;
    back-projecting the left and right color maps closest to the virtual viewpoint position in the first color map to the virtual viewpoint position based on the third depth map to obtain a second color map, where the second color map is a projection view of the first color map at the virtual viewpoint position;
    correcting the second color map by using an optical flow algorithm to obtain a third color map, where the optical flow algorithm implements aligning the left and right images of the second color map;
    performing weighting calculation and blendering on the third color map to obtain a composite image;
    wherein, the correcting a first depth map based on a first color map and the first depth map inputted comprising:
        extracting edge information of the first color map and the first depth map, and expanding the edge of the first depth map such that the edge of the first depth map is aligned with the edge of the first color map;
    wherein, the extracting edge information of the first color map and the first depth map, and expanding the edge of the first depth map such that the edge of the first depth map is aligned with the edge of the first color map comprising:
        extracting the edge of the first color map and the edge of the first depth map, and using the edge of the first color map as a reference, to detect a foreground edge and a background edge of the edge of the first depth map;
        when detecting the background direction, detecting whether the edge of the first color map exists within a first threshold range along a background direction of the foreground edge of a first depth edge; If the edge of the first color map does not exist within the first threshold range, no extended alignment is needed; If the first threshold range exists within the edge of the first color map, a second detection is performed;
        when detecting the foreground direction, detecting whether the edge of the first color map exists in a second threshold range along the foreground direction of the foreground edge of the first depth edge; If the first threshold range exists within the edge of the first color map, if the edge of the first color map does not exist in the second threshold range, no extended alignment is needed, replacing a background depth value in a path along the background direction with the nearest foreground depth value until the first color image edge for the foreground edge of the first depth map, to align the edge of the first depth map with the edge of the first color map.

2. An image synthesis method for free-viewpoint, including:
    correcting a first depth map based on a first color map and the first depth map inputted, wherein the first color map includes a left image and a right image, and the first depth map includes a left image and a right image;
    forward-projecting a second depth map to a virtual viewpoint position based on the pose of a virtual viewpoint to obtain a third depth map, where the third depth map is a projection map located at the virtual viewpoint position;
    back-projecting the left and right color maps closest to the virtual viewpoint position in the first color map to the virtual viewpoint position based on the third depth map to obtain a second color map, where the second color map is a projection view of the first color map at the virtual viewpoint position;
    correcting the second color map by using an optical flow algorithm to obtain a third color map, where the optical flow algorithm implements aligning the left and right images of the second color map;
    performing weighting calculation and blendering on the third color map to obtain a composite image;
    wherein, the correcting a first depth map based on a first color map and the first depth map inputted comprising: smoothing the first depth map aligned with the edge of the first color map to obtain a second depth map;
    wherein, the smoothing the first depth map aligned with the edge of the first color map to obtain a second depth map comprising:
    the first depth map aligned with the edge of the first color map is detected line by line according to a third threshold, determining whether there is a large depth change of the first depth map where the edge of the first depth map aligned with the edge of the first color map;
    If the depth change exceeds the third threshold, the edge having a large depth change in the first depth map aligned with the edge of the first color map is linearly changed utilizing the front 3 pixels and the following 3 pixels to replace the original pixel value to obtain a second depth map.

3. The method according to claim 1 or 2, further comprising:
using an image inpainting algorithm to repair the composite image, to fill local vacancies existing in the composite image.

4. The method according to claim 3, the image inpainting algorithm preferably uses the FMM algorithm.

5. The method according to claim 3, further comprising:
smoothing the repaired composite image to make edges of the repaired composite image smooth.

6. The method according to claim 5, the smoothing method including:
extracting the edge region of the third depth map in the composite image, and performing median filtering on the edge region of the third depth map;
extracting the edge region of the composite image and performing Gaussian blur on the edge region of the composite image.

7. The method according to claim 1 or 2, the forward-projecting a second depth map to a virtual viewpoint position based on the pose of a virtual viewpoint to obtain a third depth map, further comprising:
filtering the third depth map.

8. The method according to claim 7, the filtering is preferably median filter.

9. The method according to claim 1 or 2, the performing weighting calculation and blending on the third color map to obtain a composite image, including:
determining the weights of the left image and the right image of the third color map based on the positions of the left and right images of the third color map and the virtual viewpoint position, wherein the weights of the left image and the right image of the third color map are based on the weights of the virtual viewpoint locations;
performing the weighting calculation and blending to obtain a composite image according to the weight of the left image of the third color map and the weight of the right image.

10. The method according to claim 9, the weighting calculation uses an alpha blending algorithm.

11. The method according to claim 1 or 2, the first color map is an image taken by imaging devices with different poses.

12. The method according to claim 1 or 2, the first depth map is an image taken by an imaging device at a different poses and/or an image obtained using a depth estimation algorithm.

13. The method according to claim 1 or 2, the location of the virtual viewpoint is preferably located between a plurality of imaging devices.

14. A computer storage medium for storing a program, wherein when the program is executed, the image composition according to claim 1 or 2 is implemented.

15. An image synthesis method for free-viewpoint, including:
correcting a first depth map based on a first color map and the first depth map inputted, wherein the first color map includes a left image and a right image, and the first depth map includes a left image and a right image;
forward-projecting a second depth map to a virtual viewpoint position based on the pose of a virtual viewpoint to obtain a third depth map, where the third depth map is a projection map located at the virtual viewpoint position;
back-projecting the left and right color maps closest to the virtual viewpoint position in the first color map to the virtual viewpoint position based on the third depth map to obtain a second color map, where the second color map is a projection view of the first color map at the virtual viewpoint position;
correcting the second color map by using an optical flow algorithm to obtain a third color map, where the optical flow algorithm implements aligning the left and right images of the second color map;
performing weighting calculation and blendering on the third color map to obtain a composite image;
wherein, the back-projecting the left and right color maps closest to the virtual viewpoint position in the first color map to the virtual viewpoint position based on the third depth map to obtain a second color map , further comprising:
complementing image information of a hollow image in the right image according to the left image of the second color image, and filling the image information of the hollow image in the left image according to the right image of the second color image;
if either one of the left and right diagrams of the second color map is empty, and the corresponding position of the other one is colored, the color of the corresponding position of the opposite side of the second color map is assigned to the empty side;
if either one of the left and right diagrams of the second color map is empty and the corresponding position on the opposite side is also empty, no assignment is made on either side of the second color map.

16. An image synthesis method for free-viewpoint, including:
correcting a first depth map based on a first color map and the first depth map inputted, wherein the first color map includes a left image and a right image, and the first depth map includes a left image and a right image;
forward-projecting a second depth map to a virtual viewpoint position based on the pose of a virtual viewpoint to obtain a third depth map, where the third depth map is a projection map located at the virtual viewpoint position;
back-projecting the left and right color maps closest to the virtual viewpoint position in the first color map to the virtual viewpoint position based on the third depth map to obtain a second color map, where the second color map is a projection view of the first color map at the virtual viewpoint position;
correcting the second color map by using an optical flow algorithm to obtain a third color map, where the optical flow algorithm implements aligning the left and right images of the second color map;
performing weighting calculation and blendering on the third color map to obtain a composite image;
wherein, correcting the second color map by using an optical flow algorithm to obtain a third color map, including:
calculating an offset of the left image of the second color image relative to the right image and an offset of the right image of the second color image relative to the left image based on the optical flow algorithm;
calculating a calibration offset of the left image relative to the right image of the second color image and a calibration offset of the right image of the second color image relative to the left image based on the virtual viewpoint position;

moving the left and/or right view of the second color map based on the calibration offset of the left image relative to the right image of the second color map and the right image of the second color map relative to the calibration offset of the left image to obtain the third color map.

17. The method according to claim 15 or 16, the correcting a first depth map based on a first color map and the first depth map inputted comprising:

extracting edge information of the first color map and the first depth map, and expanding the edge of the first depth map such that the edge of the first depth map is aligned with the edge of the first color map;

smoothing the first depth map aligned with the edge of the first color map to obtain a second depth map.

18. An image synthesis apparatus for free-viewpoint, comprising:

receiving module, to receive a first color map and a first depth map;

processing module, to process the first color map and the first depth map to synthesize an image;

output module, to output a composite image;

to process the first color map and the first depth map to synthesize an image including:

correcting a first depth map based on a first color map and the first depth map inputted, wherein the first color map includes a left image and a right image, and the first depth map includes a left image and a right image;

forward-projecting a second depth map to a virtual viewpoint position based on the pose of a virtual viewpoint to obtain a third depth map, where the third depth map is a projection map located at the virtual viewpoint position;

back-projecting the left and right color maps closest to the virtual viewpoint position in the first color map to the virtual viewpoint position based on the third depth map to obtain a second color map, where the second color map is a projection view of the first color map at the virtual viewpoint position;

correcting the second color map by using an optical flow algorithm to obtain a third color map, where the optical flow algorithm implements aligning the left and right images of the second color map;

performing weighting calculation and blendering on the third color map to obtain a composite image;

wherein, the correcting a first depth map based on a first color map and the first depth map inputted comprising:

extracting the edge of the first color map and the edge of the first depth map, and using the edge of the first color map as a reference, to detect a foreground edge and a background edge of the edge of the first depth map;

when detecting the background direction, detecting whether the edge of the first color map exists within a first threshold range along a background direction of the foreground edge of a first depth edge; If the edge of the first color map does not exist within the first threshold range, no extended alignment is needed; If the first threshold range exists within the edge of the first color map, a second detection is performed;

when detecting the foreground direction, detecting whether the edge of the first color map exists in a second threshold range along the foreground direction of the foreground edge of the first depth edge; If the first threshold range exists within the edge of the first color map, if the edge of the first color map does not exist in the second threshold range, no extended alignment is needed, replacing a background depth value in a path along the background direction with the nearest foreground depth value until the first color image edge for the foreground edge of the first depth map, to align the edge of the first depth map with the edge of the first color map.

19. The image synthesis apparatus according to claim 18, the correcting a first depth map based on a first color map and the first depth map inputted comprising:

the first depth map aligned with the edge of the first color map is detected line by line according to a third threshold, determining whether there is a large depth change of the first depth map where the edge of the first depth map aligned with the edge of the first color map;

If the depth change exceeds the third threshold, the edge having a large depth change in the first depth map aligned with the edge of the first color map is linearly changed utilizing the front 3 pixels and the following 3 pixels to replace the original pixel value to obtain a second depth map.

20. An electronic device comprising:

at least one processor; and a memory communicatively coupled to the at least one processor;

where the memory stores instructions executable by the at least one processor, the instructions are executed by the at least one processor to enable the at least one processor to:

correcting a first depth map based on a first color map and the first depth map inputted, wherein the first color map includes a left image and a right image, and the first depth map includes a left image and a right image;

forward-projecting a second depth map to a virtual viewpoint position based on the pose of a virtual viewpoint to obtain a third depth map, where the third depth map is a projection map located at the virtual viewpoint position;

back-projecting the left and right color maps closest to the virtual viewpoint position in the first color map to the virtual viewpoint position based on the third depth map to obtain a second color map, where the second color map is a projection view of the first color map at the virtual viewpoint position;

correcting the second color map by using an optical flow algorithm to obtain a third color map, where the optical flow algorithm implements aligning the left and right images of the second color map;

performing weighting calculation and blendering on the third color map to obtain a composite image;

wherein, the correcting a first depth map based on a first color map and the first depth map inputted comprising:

extracting the edge of the first color map and the edge of the first depth map, and using the edge of the first color map as a reference, to detect a foreground edge and a background edge of the edge of the first depth map;

when detecting the background direction, detecting whether the edge of the first color map exists within a first threshold range along a background direction of the foreground edge of a first depth edge; If the edge of the first color map does not exist within the first threshold range, no extended alignment is needed; If the first threshold range exists within the edge of the first color map, a second detection is performed;

when detecting the foreground direction, detecting whether the edge of the first color map exists in a second threshold range along the foreground direction of the foreground edge of the first depth edge; If the first threshold range exists within the edge of the first color map, if the edge of the first color map does not exist in the second threshold range, no extended alignment is needed, replacing a background depth value in a path along the background direction with the nearest foreground depth value until the first color image edge for the foreground edge of the first depth map, to align the edge of the first depth map with the edge of the first color map.

* * * * *